E. E. Hardy,

Harness Saddle.

No. 104,023.  Patented June 7, 1870.

Witnesses:
E. J. Sommer
Phil. T. Dodge

Inventor:
E. E. Hardy
by Dodge & Munn
his attys.

UNITED STATES PATENT OFFICE.

EMERY E. HARDY, OF JOLIET, ILLINOIS.

IMPROVEMENT IN HARNESS-SADDLES.

Specification forming part of Letters Patent No. 104,023, dated June 7, 1870.

*To all whom it may concern:*

Be it known that I, EMERY E. HARDY, of Joliet, in the county of Will and State of Illinois, have invented certain new and useful Improvements in Harness-Saddles; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing the saddle-seat with a stud on its under side for projecting through and holding the crupper-loop, and in a novel manner of constructing and attaching metallic loops to hold the saddle-band in position.

Figure 1:
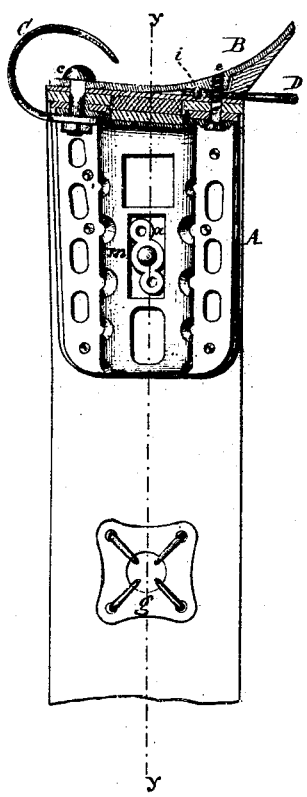
Figure 2:
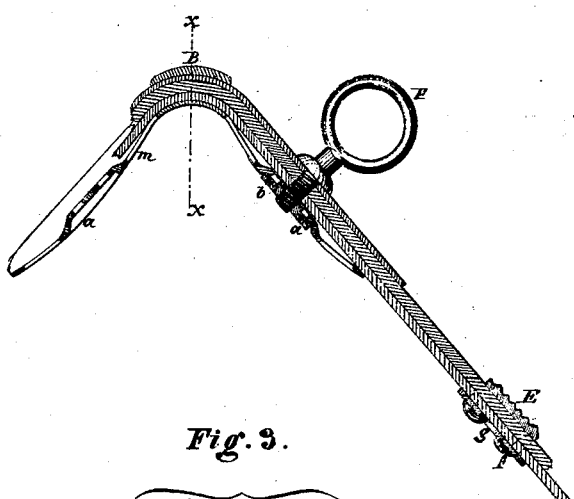
Figure 3:
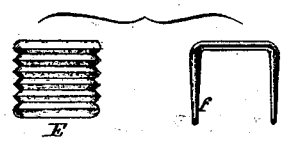
Figure 4:
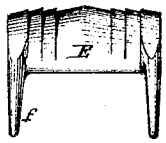

In the drawings, Figure 1 is a vertical section through my saddle, taken on the line $x\ x$ of Fig. 2. Fig. 2 is a vertical section of the saddle on the line $y\ y$ of Fig. 1; and Figs. 3 and 4 are views of the saddle-band loop detached.

A is the saddle-tree, made of metal, and formed with raised portions $m$ on its inner sides, which are provided with recesses $a$ to receive the nuts $b$ of the terrets. Over the saddle-tree I place the skirts and saddle-band, as usual, and upon these place the seat B.

C is the check-hook, the lower end of which sets against the under front side of the tree A, and which is held in place by a bolt, $c$, passing down through the seat, tree, and hook, and provided on its lower end with a nut, as shown in Fig. 1.

D is the crupper-loop, provided with a tang having two holes through it, and which is inserted under the back end of the seat, between it and the skirt. The seat B, I form with a recess to receive the end of the crupper-loop, and also with a stud, $i$, to enter the forward of the two holes in the same, and pass a screw, $e$, up through the tree and rear hole of the loop into the seat B, all as shown in Fig. 1, thus securely fastening the loop in place. The bolt $c$ and screw $e$, it will be seen, not only secure the check-hook and crupper-loop in place, but also fasten the seat, skirt, and tree together.

F are the terrets, provided with threaded necks, which are passed through the skirt and tree and screwed into the nuts $b$ in recesses $a$, as shown in Figs. 1 and 2. By setting the nuts $b$ into the recesses, as shown, they are prevented from working loose and an even surface presented for padding upon, and thus the wearing or cutting of the pads by the terret-nuts, so common in the ordinary saddle, is prevented.

E are the metallic loops, made of any desired form and shape to adapt them for various sizes and shapes of straps, and provided with two or more prongs, $f$. These loops I secure to the skirt by passing the prongs through it, placing a plate, $g$, over them, and then turning or riveting their ends down, as shown.

I am aware that saddle-trees have been constructed provided with a stud for engaging with the crupper-loop; but this I do not claim; but What I do claim is—

1. The saddle-seat B, provided with the projection on its under side, said projection having a flat surface, with the lug $i$ projecting therefrom, and a hole for the screw $e$ formed therein, all as herein shown and described.

2. The saddle-band metallic loop E, provided with prongs $f$, in combination with plates $g$, when constructed and arranged as described.

E. E. HARDY.

Witnesses:
CHARLES A. HILL,
CHAS. H. MACOMBER.